July 24, 1928.
G. HULME
SIGNAL DEVICE
Filed March 22, 1926
1,678,470
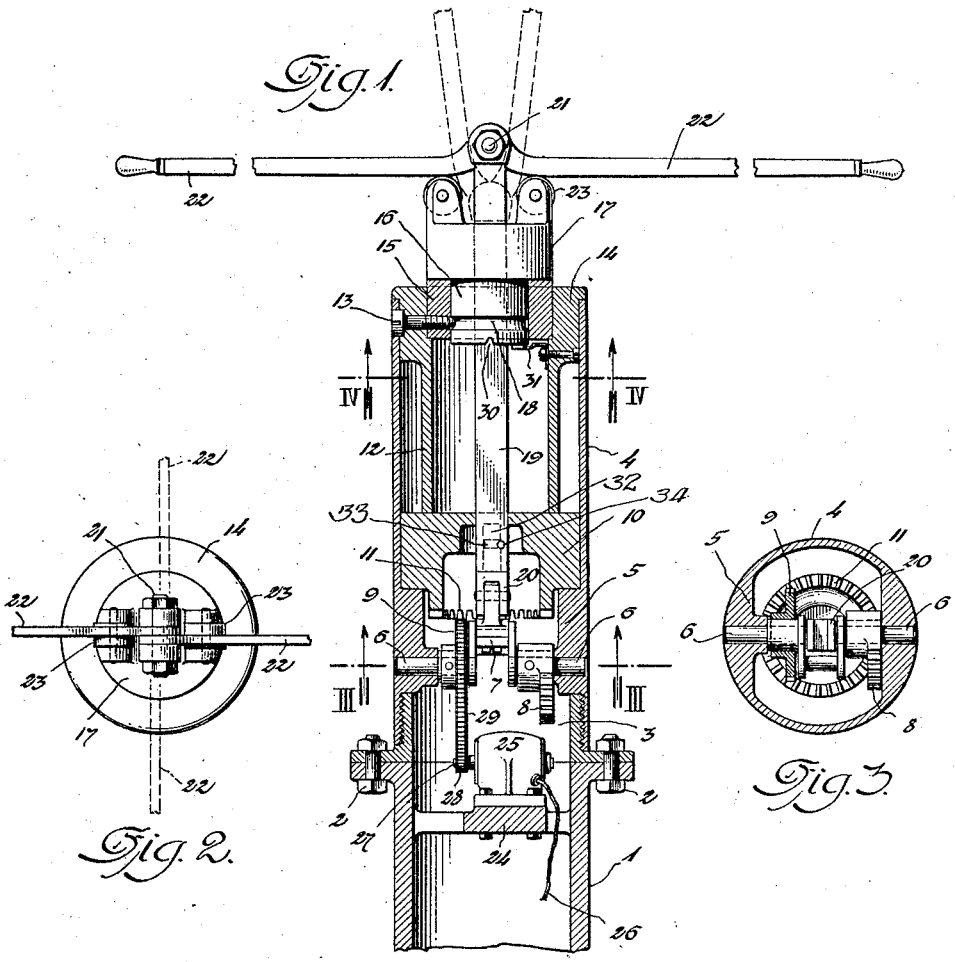
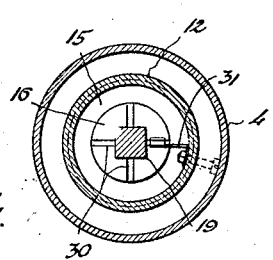
Inventor:
George Hulme
By
Attorneys.

Patented July 24, 1928.

1,678,470

UNITED STATES PATENT OFFICE.

GEORGE HULME, OF DETROIT, MICHIGAN.

SIGNAL DEVICE.

Application filed March 22, 1926. Serial No. 96,446.

This invention relates to a signal device, and my invention aims to provide a device that may be used to regulate or control traffic. As a signal, the device may be located in a street, on a corner, at the intersection of roads or streets, or any place where it may be readily observed, to indicate to pedestrians or the operators of vehicles that traffic is in a certain direction. The device can also be used as a gate or barrier at railroad or street crossings, and its operation may be controlled from a central station or from some remote point, whereby the device may serve as a unit of a traffic system.

My invention further aims to provide a strong and durable signal device embodying oscillatory or wig-wag members which may be intermittently turned to indicate directions of traffic. The device is constructed to withstand the elements to which it may be exposed by being located on a road or street, and easy access may be had to all parts of the device for lubricating and repairing purposes.

The signal device may be hereinafter specifically described and then claimed, and reference will now be had to the drawing, wherein—

Figure 1 is a vertical sectional view of the greater part of the device, partly in elevation and partly broken away;

Figure 2 is a plan of the signal device, with its oscillatory members partly broken away;

Figure 3 is a horizontal sectional view taken on the line III—III of Figure 1, and Figure 4 is a similar view taken on the line IV—IV, of Figure 1.

In the drawing, the reference numeral 1 denotes a tubular base that may be of any desired height and supported from a suitable foundation (not shown). The upper end of the tubular base is connected, as at 2, to a tubular coupling member 3 supporting a tubular pedestal 4 containing opposed bearings 5 for a transversely disposed crank shaft 6. The crank shaft 6 has a central crank portion 7, a sector gear 8 at one side thereof, and a sprocket wheel 9 at the opposite side of the crank portion 7.

Rotatable within the pedestal 4, on the bearings 5, is a hub portion 10 of a horizontally disposed gear 11, and this gear is retained within the pedestal 4 by a sleeve 12 held in place by a screw 13 extending through an enlarged end 14 of said sleeve.

Mounted in the enlarged end 14 of the sleeve 12 is a bearing 15 retained in place by the screw 13. Journaled in the bearing 15 is the stem portion 16 of a rotary head 17 seated on the bearing 15. The inner end of the screw 13 extends into an annular groove 18 of the stem 16 to pevent vertical displacement of the head 17.

Slidable through the head 17, the stem 16, and the gear hub 10 is a pitman or connecting rod 19 of substantially square cross section, at the lower end of which is a fork 20 operatively connected to the crank portion 7 of the crank shaft 6, so that when the crank shaft 6 is driven the pitman 19 may be reciprocated axially of the sleeve 12.

Pivotally connected to the upper end of the pitman 19, as at 21, are the inner curved ends of oscillatory members 22 which may be in the form of semaphore arms, gates or barriers, or signal supports. The oscillatory members 22 are in opposed relation and normally bear on anti-frictional rollers or members 23 supported by the rotary head 17.

In the tubular base 1 is a bracket 24 on which is mounted a conventional form of electric motor 25 having one or more leading-in conductors 26 so that the motor may be operated from a suitable source of electrical energy and its operation controlled from a central station or some place remote from the pedestal. The motor 25 has its armature shaft 27 provided with a small sprocket wheel 28, and trained over the sprocket wheels 28 and 9 is an endless sprocket chain 29. The wheels 9 and 28 and the chain 29 constitute power transmission means by which the motor 25 may conveniently drive the crank shaft 6. The motor 25 may be intermittently placed in operation to rotate the crank shaft 6 and reciprocate the pitman 19 to cause the members 22 to oscillate or wig-wag for a predetermined period of time. One position of the oscillatory members 22 is that of being horizontal, as shown in full lines in Figure 1, so that said oscillatory members may serve as a close gate or barrier, or may indicate "stop" for traffic in one direction, and "go" for traffic in another direction. Another position of the oscillatory members 22 has been shown partly by dash lines in Figure 1, and if these oscillatory members serve as gates or barriers, then the dash line position indicates an open position of the gates or barriers.

It will be seen in Figure 1 that the fork 20 has a round stud 32 which enters the lower end of the pitman 19. The stud has an annular groove 33 receiving a tangential pin 34 passed through the pitman, whereby relative rotary movement between the pitman and the fork is permitted. At certain intervals in the operation of the device, the rotation of the crank shaft 6 driven by the motor 25 brings the sector 8 into mesh with the gear 11, whereby the hub 10 turns the rotatable pitman 19 and the head 16.

The sector gear 8 is proportioned relative to the horizontal gear 11 so that when the crank shaft 6 is driven the sector gear 8 will intermittently mesh with the horizontal gear 11 and impart rotation to the pitman 19, which being other than round imparts rotation to the head 17. Obviously the oscillatory members 22 will be swung either to the right or the left, according to the operation of the motor 25, and to define right angular positions of the head 17, the lower end of the stem 16 has grooves or notches 30 engageable by a detent 31 within the sleeve 12. The detent is resiliently supported and is automatic in its action. It does not interfere with continuous operation of the head 17 should said head be so operated.

In so much that electrical current has been conducted into the base 1 for operating the motor 25 therein, the same source of current may be utilized for electrical illuminating devices that may be attached to the oscillatory members 22 or located on the head 17, the pitman 19 or some other part of the signal device. I deem it unnecessary to illustrate such signal lamps, but desire it to be understood that my device is capable of night use by being equipped with suitable illumination means. I attach considerable importance to the fact that the operating mechanism of the signal device is fully protected against the elements, and that the device includes oscillatory as well as rotary elements for signal purposes. It is to be understood that the structural elements entering into this device are susceptible to such changes and modifications as fall within the scope of the appended claims.

What I claim is:

1. In a signal device, a pedestal, a rotary head carried thereby, oscillatory members carried by said head adapted to rotate therewith and adapted to be oscillated during rotation of said head, a pitman slidable in said head and connected to said oscillatory members, and means in said pedestal adapted to cause rotation of said head and intermittently reciprocate said pitman to cause oscillation of said members.

2. A signal device as called for in claim 1 wherein said means includes an intermittently actuated gear and a pitman reciprocable in said gear and said rotary head, and additional means by which said pitman and gear may be driven.

3. A signal device comprising a rotary head, a reciprocable pitman extending through said head, oscillatory members carried by said pitman and adapted to be oscillated by movement of said pitman relative to said head, pitman operating means, and means operatable through the medium of said pitman operating means for imparting rotation to said head.

4. A signal device comprising a pedestal, a rotary head supported from said pedestal, a pitman reciprocable in said head, oscillatory members carried by said pitman, and operatively engaging said head so as to be oscillated by reciprocation of said pitman, a crank shaft adapted for reciprocating said pitman, gearing driven by said crank shaft and adapted by virtue of said pitman to impart rotation to said head, and means for driving said crank shaft.

5. A signal device comprising a pedestal, an intermittently driven gear therein, a reciprocable pitman extending through said gear and adapted to rotate with said gear, a source of power adapted to drive said gear and reciprocate said pitman, an oscillatory member carried by said pitman, means engageable by said member to cause oscillation thereof when said pitman is reciprocated.

6. A signal device as called for in claim 5, wherein said last mentioned means includes a rotary head through which said pitman extends and imparts rotation thereto.

In testimony whereof I affix my signature.

GEORGE HULME.